United States Patent [19]

Anderson et al.

[11] Patent Number: 5,388,261
[45] Date of Patent: Feb. 7, 1995

[54] APPARATUS AND METHOD FOR HANDLING FRAME OVERRUNS IN A DIGITAL SIGNAL PROCESSING SYSTEM

[75] Inventors: Eric C. Anderson, San Jose, Calif.; Hugh B. Svendsen, Atlanta, Ga.

[73] Assignee: Apple Computer, Inc., Cupertino, Calif.

[21] Appl. No.: 954,758

[22] Filed: Sep. 30, 1992

[51] Int. Cl.[6] .............................................. G06F 9/38
[52] U.S. Cl. ............................ 395/650; 364/DIG. 1; 364/281.7; 364/281.4; 364/231.6
[58] Field of Search .......................... 395/575, 650; 364/DIG. 1 MS File

[56] References Cited

U.S. PATENT DOCUMENTS 5,136,705  8/1992  Stubbs et al. ...................... 395/575
5,210,872  5/1993  Ferguson et al. .................. 395/650

FOREIGN PATENT DOCUMENTS

0415515  3/1991  European Pat. Off. .

Primary Examiner—Thomas M. Heckler
Attorney, Agent, or Firm—Blakely, Sokoloff, Taylor & Zafman

[57] ABSTRACT

In a computer system having a digital signal processor for processing a number of tasks within a frame, a method for handling a frame overrun wherein the tasks cannot be processed within the frame. First, the frame overrun is detected. Next, each of the tasks are compared with a processing time which had been allocated to it. A determination is made as to which of these tasks had exceeded its allotted processing time by the greatest amount. The worst case client is notified that its task has caused an overrun. All other non-system task clients are notified that a overrun has occurred. All but system support tasks are inactivated, and processing continues. Each client must determine the correct action to take, including restarting the tasks where they left off, restarting from the beginning, or quitting. Methods for handling more serious overruns are also described.

19 Claims, 5 Drawing Sheets

APPARATUS AND METHOD FOR HANDLING FRAME OVERRUNS IN A DIGITAL SIGNAL PROCESSING SYSTEM

FIELD OF THE INVENTION

The present invention pertains to the field of digital signal processing in computer systems. More particularly, the present invention relates to an apparatus and method for handling frame overruns in a frame-based computer system.

BACKGROUND OF THE INVENTION

Time correlated data such as sounds, images, speech, etc. are by their nature analog (i.e. continuous). However, computers are, for the most part, digital (i.e. discrete). In order for a digital computer to process analog signals, the analog signals are first converted into digital signals which represent the analog signals. This is accomplished by repeatedly sampling the analog signals in short time intervals and converting each sampled value into a digital value. The resulting digital signal can then be processed by the digital computer. The processing of such digitized signals by a computer is known as digital signal processing.

Presently, digital signal processing is being applied to multimedia applications whereby text, audio, speech, video, data communications, and other time correlated data are integrated to create a more effective presentation of information. However, handling these applications in a real-time environment requires a large amount of processing power. The computer's Central Processing Unit (CPU) typically does not have the requisite processing power. In order to handle the load associated with operating these tasks in real-time, one or more dedicated digital signal processors (DSPs) are employed.

A DSP is designed to accept incoming samples at the average rate that the samples are being generated by an input process. The DSP then processes the input samples according to a computer program and produces outgoing signals at the average consumption rate of an output process. One efficient method for performing real-time processing on a DSP is known as frame-based processing. In frame-based processing, time is divided into a series of discrete units known as "frames," within which all the required signal processing for that frame is completed.

This is accomplished by dividing digital signals into groups which represent the same amount of time as a frame. For example, given that Compact Disc audio data runs at a rate of 44,100 samples per second and assuming a frame rate of 10 milliseconds (100 frames per second), there would be 441 samples per frame. During each frame, the corresponding program code, variables, and input samples are loaded into a high speed cache. From the cache, the input samples are then processed according to the tasks. Finally, the resulting output data is dumped into an output buffer to be used by an output process.

In a frame-based architecture, each of the tasks is typically linked or associated with one another through a data structure. An interrupt or other timing signal is generated and sent to the DSP at the beginning of each frame. This initiates the processing of the data structure, such that each task is sequentially executed within a frame.

One of the advantages of frame based processing is that it reduces the task switching overhead. For example, given four tasks each handling a sample stream of 44,100 samples per second, if each task must be run once for every sample, you have a total of 4*44,100 or 176400 task switches in a second. By implementing frame-based processing running 100 frames per second and given the same four tasks, each of which run 100 times in a second, requires only 400 task switches per second. This reduces the task switching overhead by a factor of 441.

One major drawback with a frame-based system is increased latency. A processing system that handles one sample at a time can respond in the next sample to a change in the input. In a frame-based system, a response takes two frames. This is because data is collected in one frame, processed in the next frame, and output in the following frame.

Another problem with frame-based systems is that, because each individual frame is of a fixed time duration, there exists only a certain, finite amount of processing time per frame. Consequently, when a number of tasks are being processed in real-time, it must be ensured that the frame's processing time is not exceeded. Otherwise, the real-time process will be disrupted in an unacceptable manner. Under certain circumstances, a frame's processing might be exceeded when executing the tasks to be processed during that frame. For instance, an unexpected aspect of one of the task's algorithms might cause that task to require more processing time, resulting in a frame overrun.

Another instance which might lead to a frame overrun is if a task is sensitive to input data, and the data has been corrupted or damaged. Indeed, an overloaded bus might deteriorate the system performance to a point whereby a frame overrun occurs. In some cases, such as debugging a program on a line-by-line basis, frame overruns are inevitable. Sometimes a task's algorithm might operate properly 99.9% of the time, but due to a defect, a particular command or data sequence results in an endless loop or an inordinate increase in processing time.

Handling a frame overrun condition is relatively simple to implement if there is only one application running a single task. When the application is being written, the programmer can determine the exact sequence of events that should take place if an overrun occurs. In contrast, if a variety of multiple tasks are being installed and run by a number of different applications, a serious problem arises in determining what steps should be taken when an overrun occurs. In particular, determining the cause of the overrun, and the actions to take on a application by application basis is critical. Ideally, an overrun from one applications should impact other applications as little as possible.

Therefore, what is needed is an apparatus and method for handling any frame overruns, by determining the cause of the overrun, and taking appropriate action.

SUMMARY AND OBJECTS OF THE INVENTION

In view of the problems associated with frame overruns in a computer system having a digital signal processor which processes tasks on a frame basis, one object of the present invention is to provide an apparatus and method for handling the frame overruns.

Another object of the present invention is to minimize the impact of a frame overrun.

Another object of the present invention is to determine the most likely cause of the overrun, such that applications can be handled differently depending on whether they are causing the overrun or are working correctly.

Another object of the present invention is to classify categories of frame overruns based on the seriousness of the overrun, such that a frame overrun is handled differently depending on which category it fits into.

Another object of the present invention is to reset the digital signal processor and its I/O subsystems for serious overruns.

Another object of the present invention is to provide program debugging support by inhibiting overrun resets.

Yet another object of the present invention is to provide an apparatus and method for handling frame interrupts in a multiple digital processor environment.

The present invention is implemented in a computer system which utilizes a digital signal processor for processing a number of tasks in real-time. The computer system breaks time into discrete units known as frames. A real-time task list specifies the tasks to be processed within a frame. Normally, the real-time task list is executed within the frame. Sometimes it takes a longer than expected time to process a particular task, such that the real-time task list processing "overruns" the frame.

The present invention classifies frame overruns into three separate categories, according to the length of the overrun. The longer the overrun, the more seriously it impacts processing. A category 1 frame overrun occurs when the overrun extends from its current frame into the next frame. Category 1 frame overruns are handled by algorithmic recovery methods on the DSP itself. If the overrun extends beyond the next frame, it becomes a category 2 frame overrun. Category 2 frame overruns are handled by sending an interrupt to the host processor. The host should respond within four frames by resetting the DSP via host software. Once a frame overrun extends beyond four frames of a category 2 overrun situation, that overrun has become a category 3 overrun. For category 3 overruns, the digital signal processor and any of its I/O subsystems are reset by hardware.

The currently preferred embodiment of the present invention also includes a second task list, called the timeshare task list. This task list is executed in any excess time within each frame that is not required to execute the real-time task list. This is referred to as timeshare processing. It is important that timeshare tasks be properly handled in any frame overrun mechanism.

In the currently preferred embodiment of the present invention, frame overrun hardware is implemented to generate frame interrupt and acknowledge signals, which are utilized to detect frames overruns and their lengths. In addition, the reset signals can be inhibited to support debugging of programs, Furthermore, the present invention allows frame overruns to be handled in a multiple digital signal processor environment and handles the timeshare task issues as well.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for handling frame overruns in a frame-based computer system is described. In the following description, for the purposes of explanation, numerous specific details such as frame lengths, timing diagrams, sample rates, etc. are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview of a Computer System in the Preferred Embodiment

Figure 1:
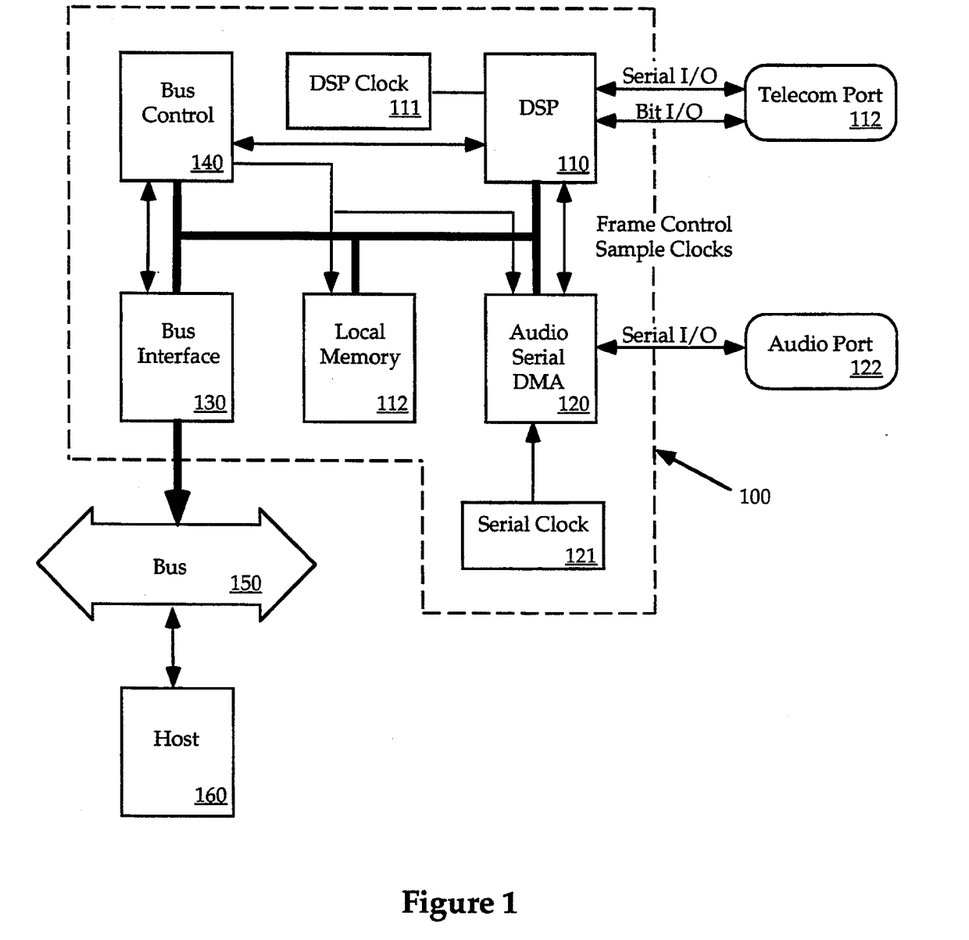
FIG. 1 illustrates a computer system as may be utilized by the preferred embodiment of the present invention.

Referring to FIG. 1, the processing system upon which the preferred embodiment of the present invention may be practiced is shown as 100. Apparatus 100 comprises a processing unit 110 which is, in this embodiment, a digital signal processor (DSP). For instance, 110 may be a DSP3210 Digital ® Signal Processor, available from American Telephone and Telegraph (AT&T) Microelectronics of Allentown, Pa. DSP 110 is driven by a DSP clock 111 which provides a timing reference.

Processing system 110 is also coupled to an audio serial DMA (direct memory access) circuit 120 which facilitates transfers between a local memory 112 and/or information transferred on bus 150. In some embodiments, there is no local memory 112, so DMA circuit 120 may allow DMA transfers on bus 150. This may include information transferred via bus 150 from a host processor circuitry 160, and/or host processor memory (not shown). In addition, audio serial DMA circuit 120 provides output to an audio port such as 122 in a serial fashion as driven by a serial clock 121. DSP 110 is also coupled to a telecom port 112 for transmission of serial and bit input/output information, such as fax and/or computer data information transmitted over telephone lines.

Processing system 100 further comprises a bus control unit 140 which is coupled to DSP 110 and a bus interface circuit 130 which facilitates communication between 100 and bus 150. Bus 150 may be either the computer bus in which 100 is installed, or may be a host bus coupled to a host processor 160. Bus 150 may be coupled to other devices such as input/output units, memory, peripheral interlaces (not shown) for providing various capabilities within the system.

Processing system 100 shown in FIG. 1 may be implemented as circuitry residing on a motherboard (main circuitry board) of a computer system or, in another embodiment, it may be implemented as an expansion card inserted into a slot in a computer system and thus communicate with host processor 160 over a communication bus 150. In one embodiment, host 160, bus 150, and processing system 100 may be one of the Macintosh ® family of personal computers such as the Macintosh ® II or Macintosh ® Quadras manufactured by Apple Computer, Inc. of Cupertino, Calif. (Apple and Macintosh ® are registered trademarks of Apple Computer, Inc.). Host 160 may comprise one of the 68000 families of microprocessors, such as the 68000, 68020, or 68030 manufactured by Motorola, Inc. of Schaumburg, Ill.

It should be noted that the structure of processing system 100 is shown as one embodiment and is not necessary for practicing the present invention. It should also be noted that in another embodiment, a plurality of additional DSPs may be coupled to a bus 150 such that a multiprocessing environment may be employed to provide enhanced capabilities. It will be appreciated by one skilled in the art that many departures and modifications of the circuitry shown in FIG. 1 may be employed to practice the present invention.

Overview of the Software Architecture

Figure 2:
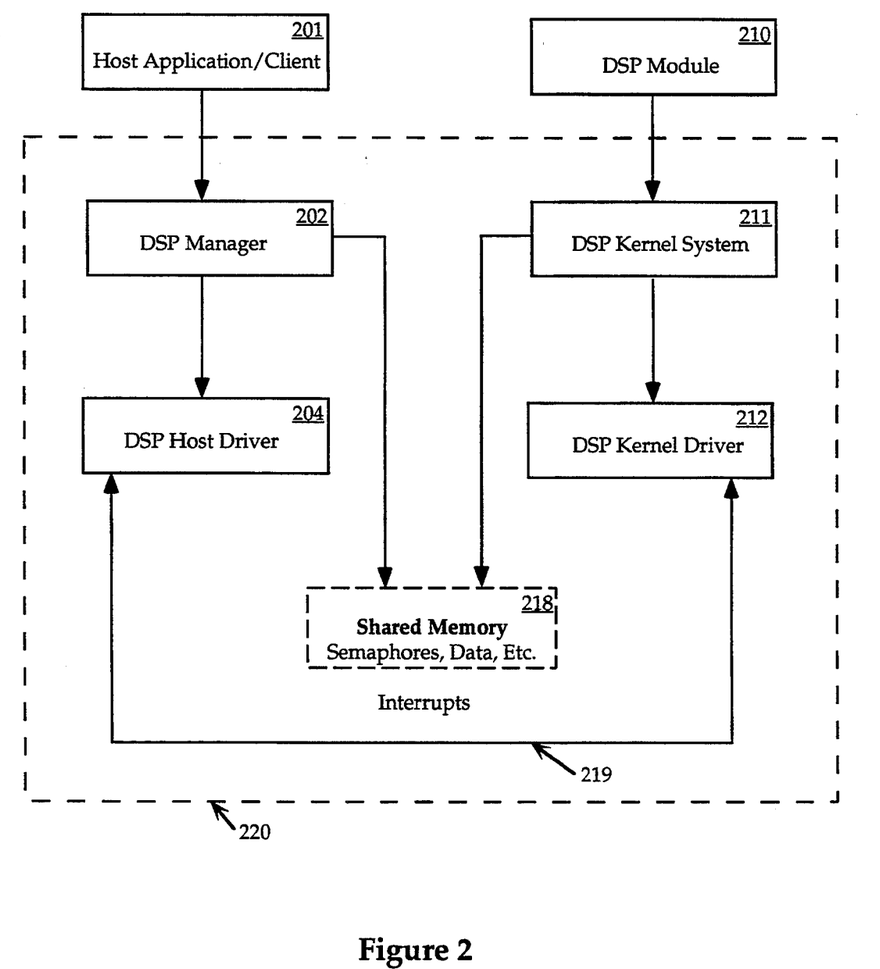
FIG. 2 illustrates a software system architecture as may be utilized by the preferred embodiment of the present invention.

The operating software for the preferred embodiment works on a team processing basis. In particular, careful attention is paid to the division of labor between the host processor and the DSP. The overall system architecture is illustrated in FIG. 2. A host application or client 201 interfaces with a DSP Manager 202. The host application or client 201 represents either a specific application program or a higher level toolbox that is being accessed by a host application. The term client is commonly used to describe a relationship between a resource and a resource requestor. In this case, the resource being requested is the DSP processor. A toolbox refers to a predefined set of callable routines that carry out commonly used functions. Typically, such toolboxes are associated with a particular function (e.g. generating a graphical output). The host application may make use of the DSP functionality either directly by accessing the DSP Manager or through a higher level toolbox.

The DSP Manager 202 provides the host functionality through which host DSP applications are developed and controlled, The DSP Manager 202 further interfaces with a DSP Host Driver 204. The DSP Host Driver 204 executes on the host processor and provides specific hardware dependent functionality required to interface with a particular DSP processor and hardware implementation. The DSP Manager 202 further interfaces with a Shared Memory 218. The Shared Memory 218 may be defined in either or both local memory or main memory. Main memory is the system DRAM. Local memory may reside on a plug-in card, or on the main logic board, or may be defined as a portion of main memory. It is through this Shared Memory 218 that the DSP Manager 202 and the DSP Kernel 211 communicate.

In regards to the DSP processor, a DSP module 210 interfaces to the DSP Kernel 211. DSP module 210 represents a particular function or program that has been written for the DSP processor. The DSP Kernel resides in a storage location directly accessible by the DSP processor. The DSP Kernel 211 interfaces to a DSP Kernel Driver 212 and Shared Memory 218. The DSP Kernel Driver 212 contains hardware dependant routines and resides in local or system memory directly accessible by the DSP processor. The DSP Kernel Driver 212 communicates to the DSP Host Driver 204 via the Shared Memory 218 and through direct interrupts 219. The combination of the DSP Manager 202, DSP Host Driver 204, Shared Memory 218, DSP Kernel 211, and DSP Kernel Driver 212, comprises the DSP Operating System 220.

Programming Structures

The programming environment of the currently preferred embodiment of the present invention is comprised of three basic structures: sections, modules, and tasks. The basic structure for a DSP application is the section. A section contains information concerning the DSP executable code, data, variables, and input/output buffers. A number of sections are grouped together to form a module. Modules are provided to the host programmer as a resource and are loaded into a DSP task structure by using the DSP Manager. A module contains information for linking modules together and for controlling the execution of the module, thereby enabling the DSP Manager and the DSP Kernel to perform their functions.

Certain modules are grouped together to form tasks. Frequently, a DSP task will contain only one DSP module. The reason for forming a task is to place together in an appropriate order and with appropriate I/O buffer connections, all of the basic module functions required to perform a particular job. A further reason is to insure that the combined functions execute as a set, thereby providing consistent execution results. Tasks and their respective modules are started and stopped as a unit, installed and removed from the task list as a unit, and are built and connected to data streams as a single unit. A task is constructed by the host application programmer, using a series of calls to the DSP Manager. These calls create the task structure, load and connect modules in the desired arrangement, allocate the required memory, and install the completed task onto the DSP task list.

Frame Overrun

A frame overrun occurs when, for any reason, the next frame interrupt occurs while the previous frame's realtime tasks are still being processed. In other words, the execution time for processing each of the tasks installed in the current realtime task list exceeds the processing time of the current frame. That is to say, the task list processing time "overruns" the current frame and continues into successive frames. The length of an overrun can vary from just a fractional part of a frame length, in cases of minor execution time miscalculation, all the way to infinity (e.g., an endless loop).

Figure 3:
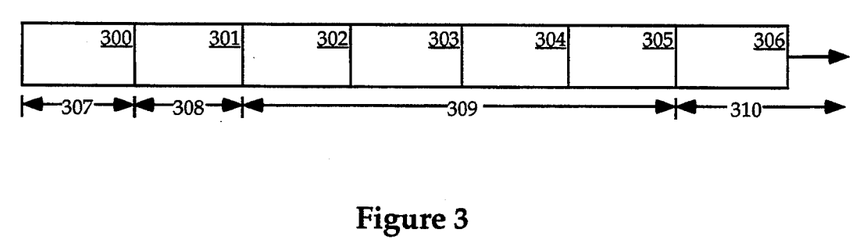
FIG. 3 illustrates seven frames and the three categories of frame overruns in reference to these seven frames.

The currently preferred embodiment of the present invention categorizes frame overruns according to its length. Frame overruns fit into one of three categories. FIG. 3 illustrates the three categories of frame overruns 308–310. Given that frame 300 is the first (current) frame, there is no overrun if the realtime task list finishes its processing within this frame 300. Once the realtime task list processing time extends beyond frame 300, a category 1 frame overrun has occurred. A category 1 overrun is defined as an overrun which extends into the second (next) frame 301 but not into the third frame 302. If an overrun extends into the third frame 302, it is classified as a category 2 overrun. A category 2 overrun encompasses the following four frames 302–305. Overruns which extend between theses four frames 302–305 fall into category 2. Category 3 overruns are those overruns which extend into the seventh frame 306 and beyond.

The number of frames that comprise the range for a category 2 frame overrun is arbitrary. It was selected as 4 in the preferred embodiment. The selection was made to allow sufficient time for a software response from the host to a serious overrun, with a fairly short time-out period to ensure that I/O functions are shut down quickly if no response is forthcoming. This is particularly important for sound and telecom functions, where undesirable sound could be distressing to the user, or where it is desirable to disconnect from the phone line quickly if a problem develops. Another reason for choosing 4 was to make the hardware implementation as simple as possible. Only a 2-bit counter is required. Clearly, some other number of frames could be used to define the range for category 2 frame overruns.

Hence, if the task list finishes processing its realtime tasks within time period 307, there is no overrun (i.e., processing is finished within the current frame 300). If the processing is completed anytime within time period 308, it has overrun its current frame and is classified as a category 1 overrun. The present invention handles types of overrun at the DSP Kernel level with subsequent assistance from the DSP Manager. If the processing is completed anytime within time period 309, it is a category 2 overrun. This case is included to provide a recovery mechanism in software by the host when the DSP is not recovering quickly. A software mechanism is preferred to hardware to allow enhancements and improvements for special cases and as better understanding of the technology develops.

If the processing takes even longer to complete, as in time period 310, it is classified as a category 3 overrun. This case is included to ensure shut down of the DSP and I/O subsystems, such as a telephone line interface (taking the DSP off line and causing a hang-up)in hardware if the host is also not responding. The hardware response is delayed long enough to allow a software response whenever possible, but is not delayed too long, in case neither host nor DSP is able to handle the situation.

In the present invention, overruns are handled differently, depending on which one of these three categories the overrun falls into. A category 1 overrun is a relatively minor overrun. Category 1 overruns are detected by the DSP Kernel's executive routine during execution of the tasks in the realtime task list. The Kernel notes if a frame boundary crossing has occurred prior to the completion of the real time task list. If so, this signifies a category 1 overrun.

Handling Category 1 Overruns

Category 1 overruns can be handled in one of three ways. In the currently preferred embodiment of the present invention, a check is made in between executing each module to determine whether that module has straddled a frame boundary. If so, realtime task processing stops (i.e., the realtime list is not completed), and the DSP Manager is informed via a message. All client tasks other than DSP operating system tasks or other "system support" tasks, such as sound I/O tasks, are set inactive. A "system support" task status is indicated by a flag in the task data structure. Processing continues at the next frame boundary, but at that point, only system tasks will be active.

Once the DSP Manager receives the frame overrun message, a message will be passed on to all clients. The DSP Manager will also determine the "cause" of the overrun by finding the "worst case offender" of excessive processing in the task list. This is done by finding the task with the largest error between expected processing and actual processing. This task's client is singled out, and a special message is sent indicating the task took longer than expected to process.

Once the clients receive the messages, the clients decide the proper course of action based on their respective programming. For example, if the task were executing a high fidelity audio recording routine when the overrun causes a glitch, the recording is ruined and would need to be restarted at the beginning. In contrast, if the overrun causes a glitch in the middle of a task which simply generates a "beep" to alert the user to some condition, it might not be necessary to restart that task from the beginning, but rather simply reactivate it. The clients each determine the sensitivity of a task to a frame overrun condition at that level and make a decision based thereon. This method allows algorithmic recovery from a category 1 frame overrun.

This approach is preferred because of the reduced complexity of the DSP Kernel and Driver, with complexity being shifted to the DSP Manager. This method is also compatible with the multiple DSP case described later.

An alternative method for handling a category 1 overrun, once it is detected, is to execute all the realtime tasks in sequence until the end of the realtime task list is reached. Thereupon, a determination is made by the Kernel as to which of the tasks in the realtime task list exceeded its allotted share of processing time to complete. The worst offender (i.e., the task with the most excessive processing time) is then set inactive. Its client is then so informed via a message through the DSP Manager. A calculation is made as to whether the remaining active tasks in the realtime task list could be processed within the remaining time in the current frame without an additional frame overrun. If so, they are processed. All tasks get a message that a frame overrun occured, and can choose to take action or ignore the message. Each task, except for the offending task, gets processed the same number of times. However, if a task were passing data to an output buffer beyond the frame interrupt, there will be a glitch in the I/O because the DMA channel will be replaying data to the I/O device from the previous frame until the data is replaced (late) in the buffer with the new data.

If there is not sufficient time to run all the remaining active realtime tasks in the remaining frame time, a task skipped message is sent to all clients, and processing continues at the next frame boundary. Again, each task is executed the same number of times, with only the offending task stopped. As in the previous case, each client must decide if some action is needed, or to ignore the message.

In this alternative method, no action is required by clients except the worst offender client, and processing continues immediately with a small or no glitch. However, significant complexity is added to the DSP Kernel (e.g., finding the worst case offender), significant realtime is lost by the search process in fairly slow external memory, and this method is not easily duplicated when more than one DSP is involved in the processing network.

Another alternative embodiment of the present invention is to determine, at the end of the realtime task list, which of the modules is the worst offender when a frame overrun is detected. The task containing that module is set inactive, and a message is sent to the client via the DSP Manager. Realtime processing proceeds immediately, although, somewhat behind schedule. The next pass through the realtime task list might complete before the next frame boundary. But depending on how large the overrun is, one or more additional overruns may occur. As long as the actual time taken to process the shortened version of the realtime task list takes less than a frame, each subsequent overrun becomes shorter and shorter until them is no longer any more overruns. This alternative embodiment offers smoother processing. However, it may take longer to recover from the impact of an overrun.

Handling Category 2 Overruns

A category 2 overrun is more serious and represents an overrun which exceeds the next frame. In other words, it has taken more than two frames to process the realtime list once. This occurs when a second interrupt is received before the first overrun is serviced. A category 2 overrun condition is detected by the interrupt logic hardware external to the DSP.

In a category 2 overrun, an interrupt is generated in hardware and sent to the host. This is done to ensure that the overrun condition is handled, since the DSP may be in an infinite processing loop. Whereupon, overrun software in the DSP Manager is executed to take appropriate action. In the preferred embodiment, the DSP Manager resets the DSP and sets inactive all tasks except system support tasks. The DSP Manager then takes exactly the same approach as in category 1: it first locates the offending DSP module that caused the overrun, and sends the appropriate message to its client. It is up to that particular client as to the course of action to take in reaction to the error message. Some typical courses of action include ignoring the error message and reactivating the task, or notifying the user and stopping operation by removing the task from the task list. The standard overrun message is sent to all other clients. The DSP is restarted, and begins processing only with system support tasks. It is up to each client to correctly restart its process, either at the beginning or simply by continuing where it left off (reactivate task).

The messages received from category 1 and 2 overruns in the preferred embodiment are the same. A signal indicating "you caused a frame overrun" is sent to the worst case offender, and a signal indicating "frame overrun—please restart your process" is sent to all other clients. This makes frame overrun handling easier for the application programmer.

Alternative embodiments for handling a category 2 overrun are similar to those described for category 1. This involves Kernel processing. First, the offending task is located. It is set inactive and the messages are sent as before. In this case, restarting the DSP continues processing for all clients except the one causing the overrun. It is important to realize that by the time the host begins processing the frame overrun, the DSP Kernel may be likewise doing so. An interlock scheme is provided so that if the Kernel has already identified the worst case offender and set it inactive, the DSP Manager does not find a second task and set it inactive as well.

Handling Category 3 Overruns

In the preferred embodiment, an overrun becomes a category 3 overrun if it persists four frames after an initial category 2 overrun. In other words, a category 2 overrun becomes a category 3 overrun if, after four frames, the DSP Manager fails to remedy the overrun. A frame length of four was chosen so as to give the DSP Manager enough time to take corrective measures (i.e., stop the DSP, locate the offender, set the offending task inactive, sending messages to the tasks, and restarting the DSP). In the event that the host does not respond to the category 2 overrun interrupt within four frames (i.e., a category 3 overrun), the hardware forces the DSP and any I/O subsystems, such as telecom and audio I/O subsystems, into reset. It is important that all DSP hardware I/O subsystems be reset when the DSP is reset. Otherwise, output speakers/headphones might experience an unpleasant noise due to the continuous repetition of the sound in the output buffers. Likewise, any in-process telephone connection should be automatically terminated.

A category 3 overrun represents an extremely serious overrun condition, such as a joint crash of the host processor and the DSP. It could also indicate a serious latency problem in the host. Consequently, the DSP and I/O subsystems need to be reset. For example, if a problem causes the DSP and host to crash in the middle of executing a modem routine, thereby resulting in a category 3 overrun, it is undesirable for the computer system to be down and for the phone line off hook for a length of time. Under such circumstances, the present invention resets the I/O and releases the phone line (i.e., hangs up the phone).

It should be noted that the host is not reset by the DSP reset signal in a category 3 overrun. Thereby, the CRT display screen remains as it was when the crash occurred. Conversely, if the host crashes without resulting in a frame overrun, the DSP continues to process data until the FIFOs are either emptied or become full.

If the host was slow, and begins processing the category 2 overrun after category 3 has occured, it uses the identical process to restart the DSP. The only difference will be that the DSP will be already in reset. This state can be detected by the DSP Manager by reading status flags in the hardware.

Frame Overruns and TimeShare

Timeshare tasks are also taken into consideration when dealing with frame overruns for realtime tasks. For Category 1 overruns, no action for timeshare is required. This is because any timeshare task that was suspended prior to the realtime frame that overran will be continued as usual once processing continues.

Category 2 and 3 overruns represent a more serious problem. In those cases, a suspended timeshare task may be damaged when the DSP is reset. This is true if the DSP chip maintains any status or data on-chip for the suspended timeshare task that is cleared by a reset. This is the case for the AT&T DSP3210® used in the preferred embodiment, which maintains a complete image of the processing pipeline when an interrupt is taken. This image is lost when a reset occurs, so the suspended task may not be resumed. In this case, the timeshare task is set inactive, and an abort message is sent to the client.

For DSP chips that allow a complete context switch with no hidden context saved internally, this situation does not come up, and the timeshare task may be restarted after the reset in the usual way.

Handling Overruns: A Summary

In summary, for category 1 overruns, which are the least serious of the three categories of overruns, algorithmic recovery methods are implemented by the DSP, with subsequent action by the DSP Manager and clients. For category 2 overruns, which are more serious, the DSP is reset and the non-sytstem tasks are set inactive and then the DSP is restarted. Similar algorithmic recovery is employed, but with a longer processing gap. For category 3 overruns, which are the most serious overrun condition, the DSP and its I/O subsystems are reset. The actions taken for category 3 could be taken at a category 2 event (i.e., hardware reset the DSP and I/O subsystem at the same time an interrupt is sent to the host).

In the currently preferred embodiment, providing three categories of frame overrun allows additional software enhancements to be implemented. One example is the addition of an "Auto Restart" flag in the task structure an API call to allow a client to set the flag. This flag, if set, tells the DSP Manager to not send a frame overrun message to the client, but rather to reactivate the task. If the task was the worst case offender, the flag is ignored. Other enhancements may be created to support special applications, as needed.

Frame Overrun Hardware

Figure 4:
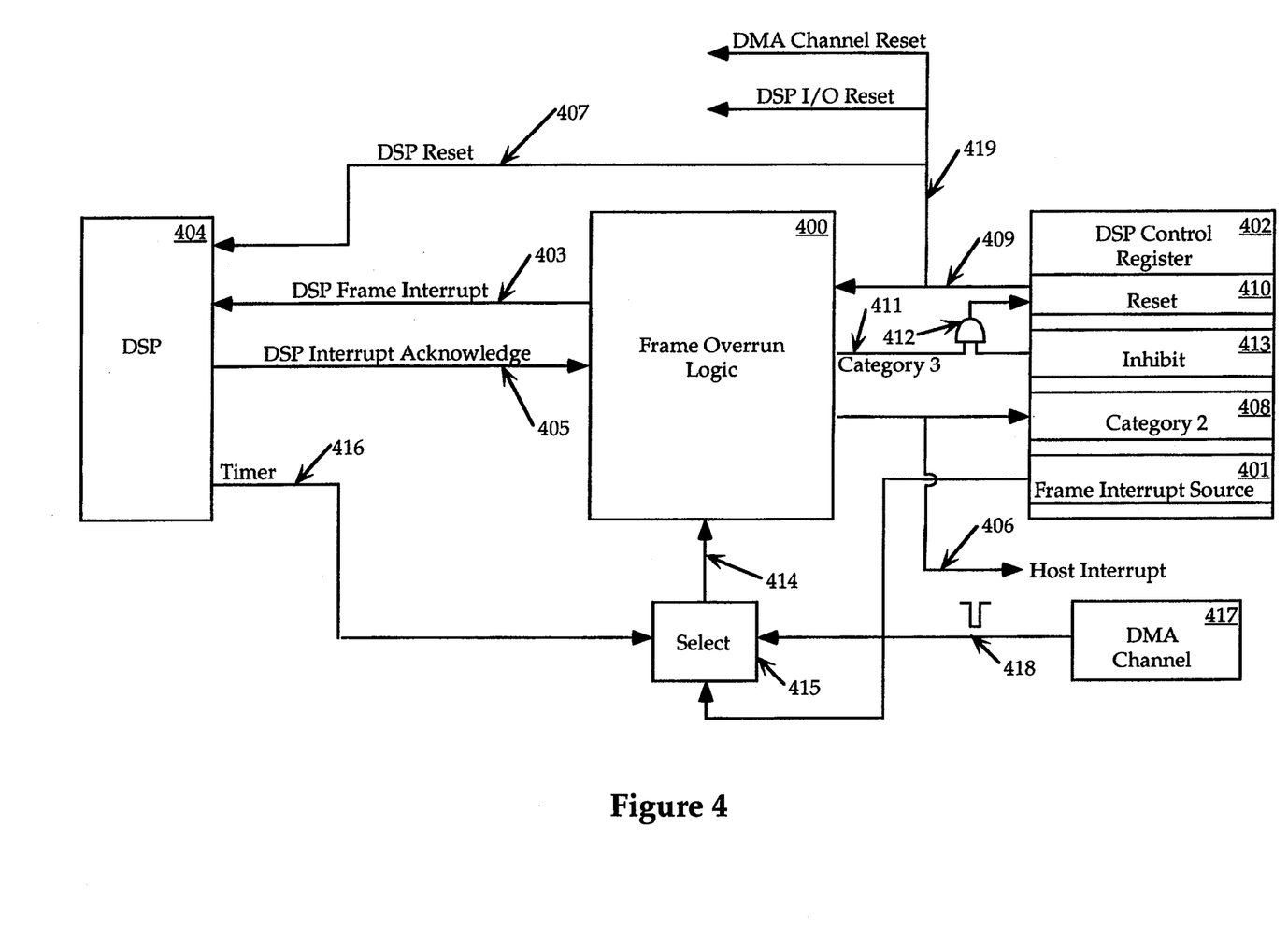
FIG. 4 is a block diagram illustrating the currently preferred embodiment of the frame overrun hardware.

As described above, certain frame overrun hardware is required to support the present invention. In particular, a means of handling all three categories of frame overrun is required. FIG. 4 is a block diagram illustrating the currently preferred embodiment of the frame overrun hardware. One of the functions of the frame overrun logic 400 is to accept a frame interrupt (i.e., a pulse) 418 from the DMA channel 417 or other source and generate a frame interrupt signal 403 to the DSP 404. The frame interrupt signal 403 is kept active until DSP 404 returns a proper acknowledge signal 405. DSP 404 sends an acknowledge signal 405 when the frame interrupt is taken.

Figure 5:
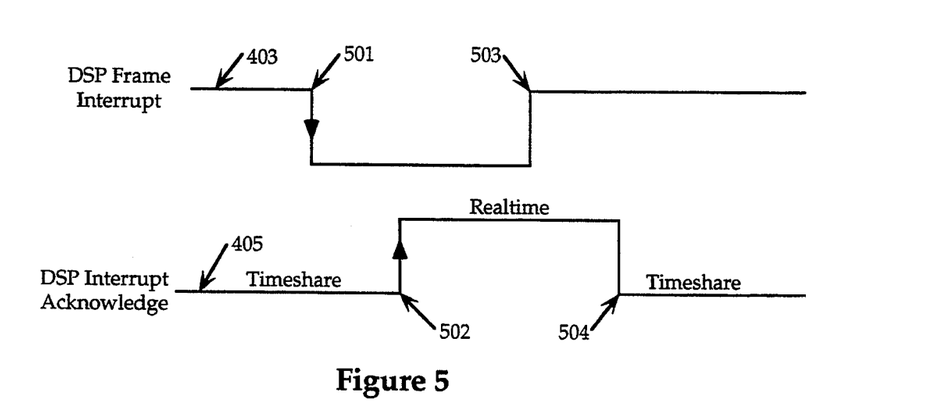
FIG. 5 is timing diagram illustrating frame interrupt and acknowledge signals corresponding to a non-overrun processing situation.

FIG. 5 is a timing diagram illustrating interrupt 403 and acknowledge 405 signals corresponding to normal, non-overrun processing in the case of the DSP3210® Digital Signal Processor, available from American Telephone and Telegraph (AT&T) Microelectronics of Allentown, Pa. The signaling may differ for various processors, but the same function can be implemented. The DSP frame interrupt signal 403 goes to a low state (e.g., ground) upon the occurrence of a frame boundary (501). It remains low until a positive transition 502 on the DSP interrupt acknowledge signal 405 is detected. The DSP interrupt signal 403 is set "high" (e.g., +5 volts) only when the interrupt has been taken by the DSP.

A negative transition 504 on DSP interrupt acknowledge signal 405 indicates the execution of an interrupt return instruction which signifies that the DSP has finished its realtime tasks for that frame and is proceeding on a timeshare basis. Essentially, DSP interrupt acknowledge signal 405 indicates whether the DSP is operating on a realtime versus a timeshare basis. The duty cycle (percent realtime to percent timeshare) of the acknowledge signal 405 varies, depending on the actual realtime load on the DSP.

Figure 6:
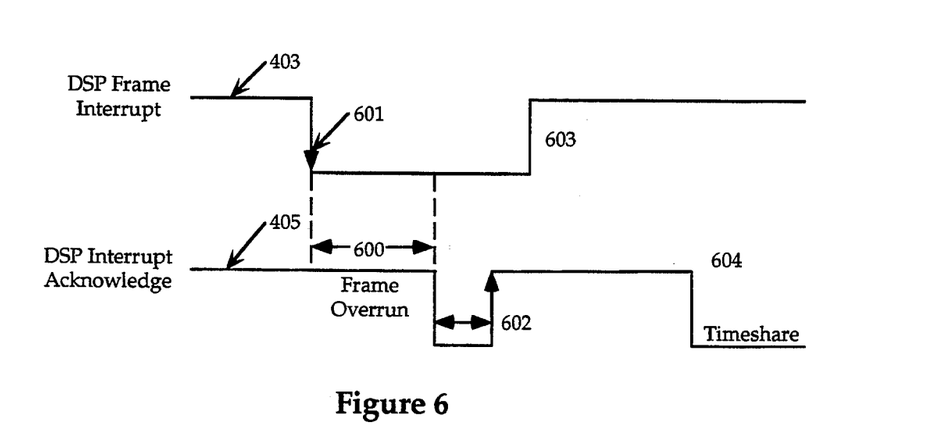
FIG. 6 is a timing diagram illustrating frame interrupt and acknowledge signals corresponding to a category 1 frame overrun.

If the next frame boundary occurs before the DSP returns to processing on a timeshare basis, a category 1 frame overrun has just occurred. FIG. 6 is a timing diagram illustrating interrupt 403 and acknowledge 405 signals corresponding to a category 1 frame overrun. A frame overrun 600 occurs if a subsequent frame interrupt 601 occurs on DSP frame interrupt signal 403 and the DSP interrupt acknowledge signal 405 is still "high". The DSP Kernel detects the overrun after execution of the realtime task list or the current realtime module, by reading the state of the DSP frame interrupt signal 403. A "low" signal indicates an overrun. Given an overrun condition, the DSP Kernel should clear the interrupt by pulsing the interrupt acknowledge line. The mechanism for this depends on the features of the DSP. If this can be done directly on software without actually returning from the previous interrupt and then taking the new interrupt, this would be the method used. Otherwise, external hardware should be employed to accomplish this, such as a programmable pulse logically combined with the DSP's interrupt acknowledge signal, triggered by software. Clearing (i.e., acknowledging) the interrupt causes the request to go away and prevents a category 2 event from happening while the Kernel is processing category 1.

After clearing the interrupt, the DSP Kernel processes the overrun as described previously. Once this is complete, the DSP Kernel returns from the realtime interrupt level. Note that this includes any required context switch from realtime to timeshare. Thereby, the acknowledge line is restored to its low state. If another frame interrupt has already occured, the interrupt will be immediately taken, and realtime is run again with all but system support tasks being set inactive. Otherwise, timeshare processing proceeds until the next frame boundary.

Figure 7:
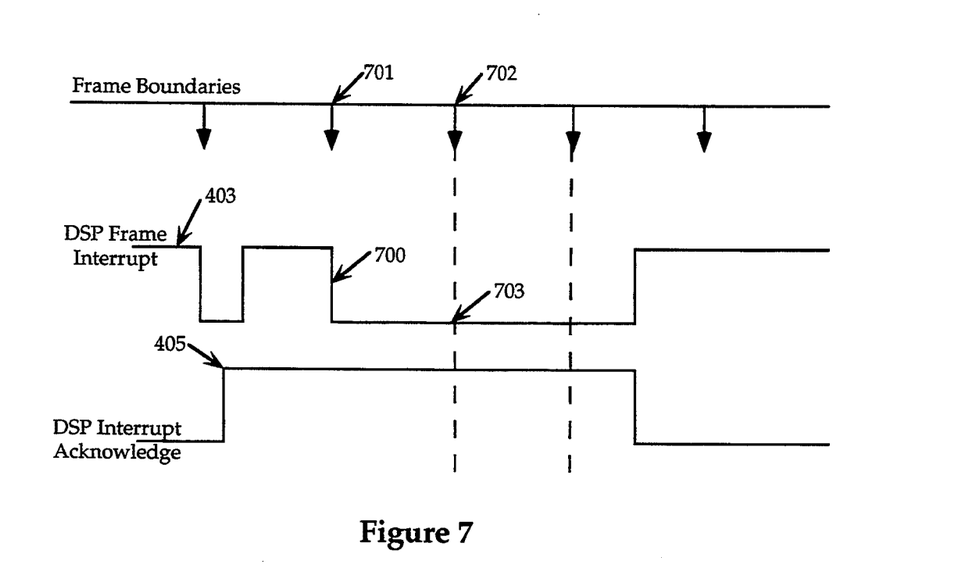
FIG. 7 is a timing diagram illustrating frame interrupt and acknowledge signals corresponding to a category 2 frame overrun.

If the interrupt request remains active over an entire frame, this signifies a category 2 overrun. FIG. 7 is a timing diagram illustrating interrupt 403 and acknowledge 405 signals corresponding to a category 2 overrun. A category 1 frame overrun 700 occurs at the first frame boundary 701 when DSP frame interrupt signal 403 is "low" and DSP frame acknowledge signal 405 is "high". A category 2 frame overrun 703 is signified by the next frame boundary 702 if DSP frame interrupt signal 403 remains "low" and DSP frame acknowledge signal 405 remains "high".

Referring back to FIG. 4, once frame overrun logic 400 detects a category 2 overrun, it generates and sends an interrupt signal 406 to the host. The host then instructs the DSP Manager interrupt service routine to handle the overrun condition as previously described. Each time, thereafter, if an frame boundary is crossed, a category 2 counter is incremented by one. If the category 2 register ever reaches a count of four (i.e., four frames), a category 3 overrun has occurred and a category 3 register reset bit 410 is set. When this register reset bit 410 is set, a reset signal 409 is sent to reset the frame overrun logic 400, the DSP 404, the DSP I/O subsystem, and the DMA channel. In addition, the host can control the register reset bit 410.

In the currently preferred embodiment of the present invention, the category 3 detect signal 411 is input to an AND gate 412. A signal from inhibit register 413 provides the other input to AND gate 412. The output of AND gate 412 triggers the reset register 410. In such an implementation, a category 3 overrun can be inhibited from automatically generating a reset signal. This scheme allows a programmer to perform a line-by-line debug operation without continually triggering resets. Note that the inhibit gate could also be incorporated at other points in the circuit, including at point 419. This allows the host to detect the occurrence of a category 3 overrun that is being inhibited by the inhibit flag.

In the currently preferred embodiment of the present invention, there are two sources which can be used as frame interrupts 414. One frame interrupt source is a timing signal 416 from the DSP 404. The timing signal 416 is generated from a down-counting timer, internal to DSP 404. The timer automatically reloads when it times out. A frame interrupt pulse is generated when the timer reloads. The other source for frame interrupts is from the DMA channel 417. The DMA channel 417 passes a pulse for every frame: one when the buffer half-way point is passed and one when the buffer wraps back to the beginning. Multiplexer 415 selects between these two sources as to which is to be used to signal the frame interrupts. Control bit 401 selects the source.

In a multiple DSP environment, the DSPs can operate asynchronously and perform data processing independently from one another. In such an implementation, multiplexer 415 selects the frame interrupts from the DMA channel for each DSP. A method for allowing multiple DSPs to simultaneously process one function, is to synchronize "slave" DSPs to a "master" DSP with synchronization software. This is accomplished by forcing the frames of the "slave" DSP to lock onto the frames of the "master" DSP. Consequently, in a "master/slave" multiple DSP implementation, the "master" DSP utilizes the frame interrupts generated from the DMA channel, while the "slave" DSP(s) utilize the frame interrupts generated by their timers, which are under the control of the synchronization software.

What is claimed is:

1. In a computer system having a digital signal processor for processing a plurality of tasks within a frame, a method for handling a frame overrun occurring when said plurality of tasks cannot be processed within said frame, comprising the steps of:
    detecting said frame overrun, wherein when said frame overrun is detected:
    A) comparing an actual processing time of each of said plurality of tasks with an allocated processing time corresponding to each of said plurality of tasks;
    B) determining which task of said plurality of tasks most exceeds its allocated processing time;
    C) setting said task having said actual processing time which most exceeds its allocated processing time inactive;
    D) processing said plurality of tasks except for any inactive task.

2. The method of claim 1 further comprises the steps of:
    determining whether said frame overrun has exceeded one frame;
    resetting said digital signal processor in software if said frame overrun exceeds one frame.

3. The method of claim 2 further comprises the steps of:
    determining whether said frame overrun exceeds a pre-determined number of frames;
    resetting said digital processor and an input/output subsystem for inputting/outputting data to/from said digital signal processor if said frame overrun exceeds said pre-determined number of frames.

4. The method of claim 3, wherein said frame overrun is determined by reading a frame interrupt signal and a frame acknowledge signal, said frame interrupt signal indicating a frame boundary between two frames has passed and said frame interrupt acknowledge signal indicating whether said digital signal processor is continuing to process said plurality of tasks, wherein an occurrence of said frame boundary while said plurality of tasks is continuing to be processed signifies said frame overrun.

5. The method of claim 4, wherein determination of whether said frame overrun exceeds said pre-determined number of frames is accomplished by an incrementer being incremented for each frame boundary during said frame overrun such that a reset signal is generated when said incrementer reaches said predetermined number, said reset signal resetting said digital signal processor and said input/output subsystem.

6. The method of claim 5 further comprises the step of inhibiting said resetting step.

7. The method of claim 6 further comprises a step for aborting and setting inactive a timeshare task if said timeshare task straddles said frame boundary when said digital signal processor is reset.

8. The method of claim 7, wherein said frame interrupt signal is derived from a down-counting timer coupled to said digital signal processor, wherein said timer reloads and an interrupt is generated upon time-out of said timer.

9. The method of claim 8 further comprising the step of sending a message to a client when said frame overrun is detected.

10. The method of claim 9 further comprising the step of setting all non-system tasks inactive.

11. In a computer system having a task list specifying at least one task to be processed by a digital signal processor coupled to said computer system, an apparatus for responding to a frame overrun, wherein execution of said task list exceeds a frame, said apparatus comprising:
    a detector coupled to said digital signal processor for detecting said frame overrun;
    an operating system associated with said computer system for comparing an actual processing time corresponding to each task of said task list with an allocated processing time corresponding to each task of said task list, said operating system setting inactive a task of said task list which most exceeds its respective allocated processing time.

12. The apparatus of claim 11 further comprises:
    a detector coupled to said distal signal processor for detecting when said frame overrun extends beyond one frame;
    a resetting circuit coupled to said detector for resetting said digital signal processor if said frame overrun extends beyond one frame.

13. The apparatus of claim 11 further comprises:
    a counter coupled to said digital signal processor for counting a number of frame boundaries which occurs during said frame overrun;
    a resetter coupled to said counter for resetting an input and output subsystem coupled to said digital signal processor if said counter exceeds a pre-determined number.

14. The apparatus of claim 11, wherein said detector comprises frame overrun logic coupled to said digital signal processor for generating a frame interrupt signal indicating a frame boundary between two successive frames, said frame overrun logic also sensing a frame interrupt acknowledge signal indicating whether said digital signal processor is executing said task list, wherein an occurrence of said frame boundary while said digital signal processor is executing said task list signifies said frame overrun.

15. The apparatus of claim 14 further comprises an inhibitor for inhibiting said reset of said digital signal processor and said input and output subsystem.

16. The apparatus of claim 15 further comprises an aborter for aborting a timeshare task if said timeshare task straddles a frame boundary during a digital signal processor reset.

17. The apparatus of claim 16 further comprises:
a timer coupled to said digital signal processor for specifying an instant in time for generating a frame interrupt.

18. The apparatus of claim 17 further comprising a generator for generating a message to a client indicating a frame interrupt.

19. The apparatus of claim 18 further comprising logic for setting all non-system tasks inactive.

* * * * *